United States Patent
Pott et al.

(10) Patent No.: US 7,832,381 B2
(45) Date of Patent: Nov. 16, 2010

(54) METHOD OF OPERATING AN INTERNAL COMBUSTION ENGINE

(75) Inventors: Ekkehard Pott, Gifhorn (DE); Oliver Fladung, Braunschweig (DE); Jörg Theobald, Lehre (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 12/627,243

(22) Filed: Nov. 30, 2009

(65) Prior Publication Data

US 2010/0131177 A1    May 27, 2010

Related U.S. Application Data

(63) Continuation of application No. PCT/EP2008/002921, filed on Apr. 12, 2008.

(30) Foreign Application Priority Data

May 30, 2007 (DE) .................. 10 2007 025 075

(51) Int. Cl.
*F02M 21/02* (2006.01)
*F02B 3/00* (2006.01)
(52) U.S. Cl. .................... 123/525; 123/27 GE; 123/304
(58) Field of Classification Search ................. 123/525, 123/27 GE, 527, 304, 575; 701/103, 104
See application file for complete search history.

(56) References Cited

U.S. PATENT DOCUMENTS

| 5,195,482 | A | | 3/1993 | Smith |
| 5,542,398 | A | * | 8/1996 | Marcon ....................... 123/527 |
| 5,755,211 | A | | 5/1998 | Koch |
| 6,035,837 | A | | 3/2000 | Cohen et al. |
| 6,047,671 | A | | 4/2000 | Tubb et al. |
| 6,463,916 | B1 | * | 10/2002 | Coplin et al. ............... 123/531 |
| 6,892,691 | B1 | | 5/2005 | Uhl et al. |
| 7,080,624 | B2 | | 7/2006 | Britsch et al. |

(Continued)

FOREIGN PATENT DOCUMENTS

DE    19958177 A1    1/2001

(Continued)

OTHER PUBLICATIONS

International Search Report dated Sep. 11, 2008.

*Primary Examiner*—John T Kwon
(74) *Attorney, Agent, or Firm*—Laurence A. Greenberg; Werner H. Stemer; Ralph E. Locher

(57) ABSTRACT

A method for operating an internal combustion engine in the form of an Otto engine, especially of a motor vehicle, selectively uses carburetor fuel, especially gasoline or ethanol (E85) by direct injection into at least one combustion chamber of the internal combustion engine by means of at least one fuel injector. Optionally, instead of injecting ignition spark engine fuel or in addition to injecting ignition spark engine fuel, the internal combustion engine is operated with gas, especially CNG (Compressed Natural Gas) or LPG (Liquefied Petroleum Gas). A mixture adaptation value is continuously determined during the operation of the internal combustion engine with spark ignition engine fuel. An actual mixture adaptation value is stored in a memory during the operation of the internal combustion engine with the spark ignition engine fuel and, after a predetermined minimum duration of operation with gas, an actual mixture adaptation value is compared with the stored mixture adaptation value during the operation of the internal combustion engine with ignition spark engine fuel. The fuel injectors are scavenged when a difference between the actual mixture adaptation value and the stored mixture adaptation value exceeds a predetermined difference value.

13 Claims, 1 Drawing Sheet

U.S. PATENT DOCUMENTS

| | | | |
|---|---|---|---|
| 7,159,568 B1 | 1/2007 | Lewis et al. | |
| 2001/0003977 A1* | 6/2001 | Hayashi et al. | 123/480 |
| 2003/0158061 A1* | 8/2003 | Ahmadi et al. | 510/185 |
| 2004/0139944 A1* | 7/2004 | Nakano et al. | 123/406.47 |
| 2006/0047406 A1* | 3/2006 | Chatfield et al. | 701/104 |
| 2007/0012028 A1* | 1/2007 | Weissman et al. | 60/275 |

FOREIGN PATENT DOCUMENTS

| | | | |
|---|---|---|---|
| DE | 19945813 A1 | 3/2001 |
| DE | 69628979 T2 | 2/2004 |
| DE | 102006060851 A1 | 5/2007 |
| EP | 0718484 A2 | 6/1996 |
| EP | 0761961 A1 | 3/1997 |
| EP | 1344920 A2 | 9/2003 |
| JP | 2004239213 A | 8/2004 |
| WO | 0026521 A1 | 5/2000 |
| WO | 03027473 A1 | 4/2003 |

* cited by examiner

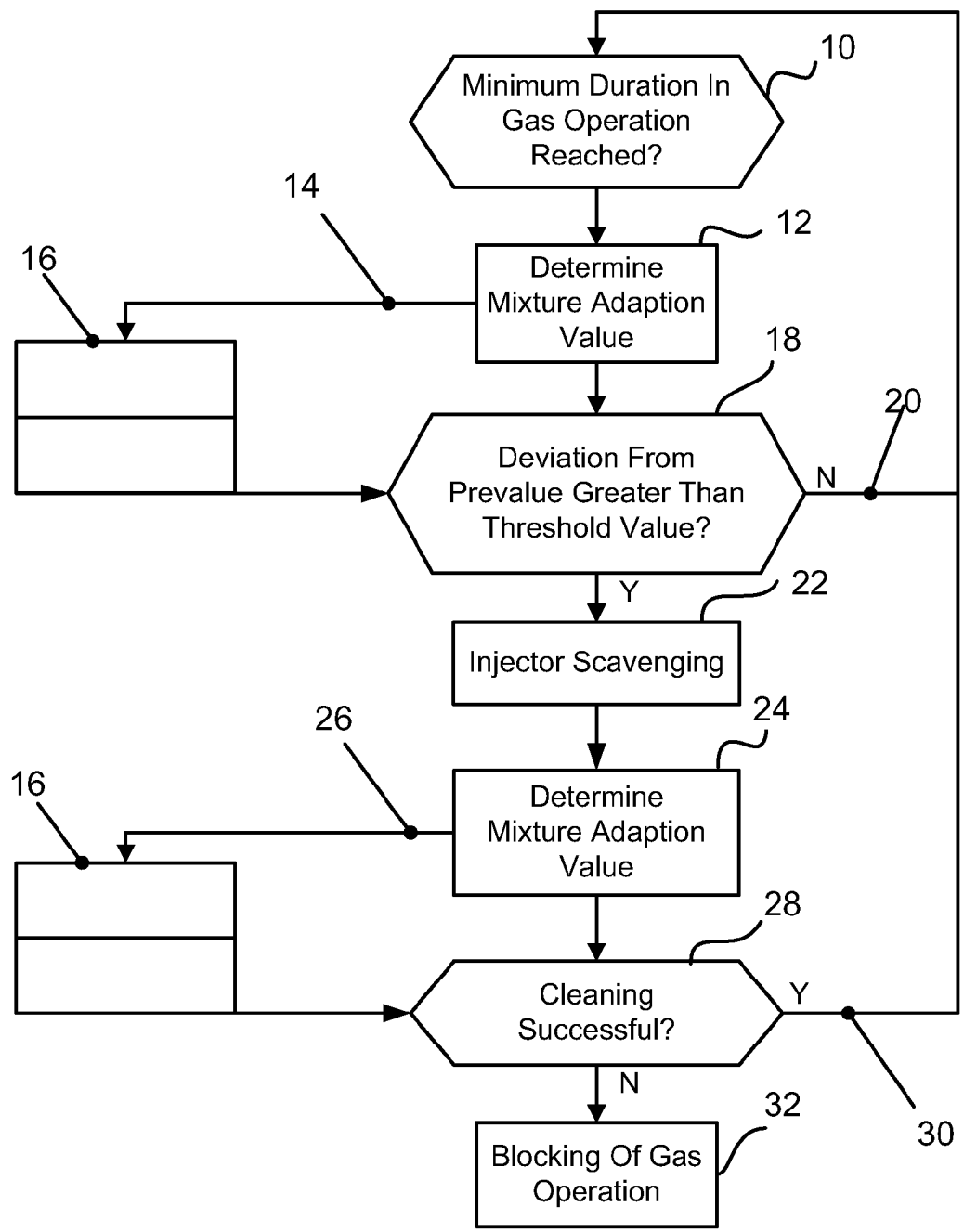

METHOD OF OPERATING AN INTERNAL COMBUSTION ENGINE

CROSS-REFERENCE TO RELATED APPLICATION

This application is a continuation of copending international patent application No. PCT/EP2008/002921, dated Apr. 12, 2008, which designated the United States; the application also claims the priority, under 35 U.S.C. §119, of German patent application DE 10 2007 025 075.6, dated May 30, 2007; the prior applications are incorporated by reference in their entirety.

BACKGROUND OF THE INVENTION

Field of the Invention

The invention lies in the field of internal combustion engines. More specifically, the invention relates to a method of operating an internal combustion engine in the form of an Otto engine, in particular an engine of a motor vehicle. Otto engine fuel, also referred to as carburetor fuel or ignition spark engine fuel in the following, in particular gasoline or ethanol (E85), is injected directly into at least one combustion space of the internal combustion engine by way of at least one fuel injector, and, selectively, the internal combustion engine is operated with gas, in particular CNG (Compressed Natural Gas) or LPG (Liquefied Petroleum Gas) instead of the injection of carburetor fuel or in addition to the injection of carburetor fuel. A mixture adaptation value is continuously being determined while the internal combustion engine is operating with carburetor fuel.

In an Otto engine (i.e., carburetor engine) with direct gasoline injection, the high-pressure injection injectors for injecting liquid carburetor engine fuels issue directly into the combustion space. Consequently, when the engine is in operation, the injectors are acted upon with hot combustion gases as a result of combustion taking place in the combustion space and are heated up. The injectors are cooled by the injected fuel and the engine cooling water ducts running in direct proximity to the injector. When such a direct-injection carburetor engine is operated with CNG (Compressed Natural Gas), as is known, for example, from U.S. Pat. No. 5,755,211 and European patent EP 0 718 484 B1, there is the risk that, during CNG operation, the high-pressure injectors heat up due to the lack of throughput of liquid fuel and are consequently damaged or the fuel still located inside the injectors forms deposits which, in turn, have an adverse effect on the injector behavior. The longer gas operation with deactivated gasoline injection continues, the greater is the risk that deposits from the stationary fuel occur inside the injector and are detrimental to a correct operation of the injector.

It is known from U.S. Pat. No. 6,047,671 and European patent EP 0 761 961 B1, in order to avoid deposits in the injector valve, to add a lubricant and/or cleaning agent to the fuel upstream of the fuel injector or directly in the fuel injector.

BRIEF SUMMARY OF THE INVENTION

It is accordingly an object of the invention to provide a method of operating an internal combustion engine which overcomes the above-mentioned disadvantages of the heretofore-known devices and methods of this general type and which provides for a robust method with improved operating reliability of the fuel injectors.

With the foregoing and other objects in view there is provided, in accordance with the invention, a method of operating an internal combustion engine, such as an Otto engine in a motor vehicle. The method comprises the following steps:

operating the internal combustion engine with carburetor fuel (i.e., gasoline, ethanol) by injecting the carburetor fuel directly into at least one combustion space of the internal combustion engine by way of at least one fuel injector;

selectively operating the internal combustion engine with gas (i.e., CNG, LPG) instead of injecting the carburetor fuel or in addition to injecting the carburetor fuel;

continuously determining a mixture adaptation value while the internal combustion engine is operated with carburetor fuel;

storing a current mixture adaptation value in a memory while the internal combustion engine is being operated with carburetor fuel;

after a predetermined minimum operating duration with gas, comparing a current mixture adaptation value with a stored mixture adaptation value during the operation of the internal combustion engine with carburetor fuel; and if a difference between the current mixture adaptation value and the stored mixture adaptation value overshoots a predetermined differential value, scavenging the at least one fuel injector.

In other words, the objects of the invention are achieved in that a current mixture adaptation value is stored in a memory while the internal combustion engine is operated with carburetor fuel, and, after a predetermined minimum operating duration with gas, a current mixture adaptation value is compared with the stored mixture adaptation value during the operation of the internal combustion engine with carburetor fuel, a scavenging (i.e., purging, flushing) of the fuel injectors being carried out when a difference between the current mixture adaptation value and the stored mixture adaptation value overshoots a predetermined differential value.

The advantage of this is that deposits possibly present on or in the fuel injectors are detected via the variation in the mixture adaptation value, and a cleaning of the fuel injectors which is required, if appropriate, is initiated. This achieves an increase in robustness of bivalent gas engines by means of a reduction in persistent fouling in the fuel injectors.

To clean the fuel injectors, for scavenging through each fuel injector, a quantity of a scavenging fluid, in particular of the carburetor fuel, is conducted through a fuel injector. A preferred quantity corresponds to 50 to 50 000 times, in particular 200 to 1000 times, the volume of carburetor fuel stored in a fuel injector.

Expediently, the predetermined minimum operating duration with gas amounts to 200 seconds to 40 000 seconds, in particular 2000 seconds to 10 000 seconds, in particular 5000 seconds.

Expediently, after the predetermined minimum operating duration with gas has elapsed, the internal combustion engine is operated with carburetor fuel and the current mixture adaptation value is determined.

In order to detect a successful or, where appropriate, unsuccessful scavenging of the injectors, after a scavenging has been carried out, a current mixture adaptation value is determined and is compared with the mixture adaptation value ascertained before scavenging, a fault being established when a difference between the current mixture adaptation value after scavenging and the mixture adaptation value before scavenging is lower than a predetermined value. In the event of a fault, to avoid further deposits on the fuel injectors, further operation of the internal combustion engine with CNG is blocked.

For example, the storage of a current mixture adaptation value takes place after the supply of new carburetor fuel into a fuel tank, after each or a predetermined number of comparisons of a current mixture adaptation value with the stored adaptation value, after each or a predetermined number of starting actions of the internal combustion engine, after each or a predetermined number of driving cycles, after each successful scavenging of the fuel injectors and/or after a predetermined number of successful scavenging operations of the fuel injectors.

The invention is explained in more detail below with reference to the drawing. This shows, in the single FIGURE, a diagrammatic flow chart of a preferred embodiment of a method according to the invention.

An exemplary embodiment of a method according to the invention for operating a bivalent internal combustion engine, that is to say an internal combustion engine which can be operated selectively with carburetor fuel (gasoline, ethanol) injected out of fuel injectors into combustion spaces of the internal combustion engine or with gas (CNG or LPG) introduced into a suction pipe of the internal combustion engine, is described below.

Other features which are considered as characteristic for the invention are set forth in the appended claims.

Although the invention is illustrated and described herein as embodied in a method of operating an internal combustion engine, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

BRIEF DESCRIPTION OF THE DRAWING

The FIGURE of the drawing is a flowchart illustrating an exemplary method sequence according to the invention.

DESCRIPTION OF A PREFERRED
EMBODIMENT OF THE INVENTION

Referring now to the sole FIGURE of the drawing in detail, there is show an exemplary process according to the invention: In a first step 10, the system tests whether or not a minimum duration in gas operation has been reached. This determines whether or not a predetermined minimum operating duration of operation of the internal combustion engine with gas has been reached. If this is so, in a subsequent step 12 ("determination of mixture adaptation value"), the system determines a current mixture adaptation value in straightforward carburetor fuel operation. This current mixture adaptation value thus determined is stored in a shift register memory 16 via the branch 14. In the shift register memory 16, this current mixture adaptation value is compared with a mixture adaptation value previously stored in a non-volatile memory, and the result of the comparison is transferred to the following query step 18 ("deviation from prevalue greater than threshold value"). In step 18, the system determines whether or not a difference between the current mixture adaptation value for step 12 and the stored mixture adaptation value (i.e., the previously stored value) is greater than the predetermined threshold value. If the result is "no", the system loops back to step 10 via the branch 20, and the predetermined minimum operating duration for gas operation is awaited again, until the method starts once more with step 12. If the result in step 18 is "yes", a step of scavenging (i.e., purging or flushing), of the fuel injectors is carried out in a subsequent step 22 ("injector scavenging").

After the scavenging according to step 22, the system determines a mixture adaptation value once again in a subsequent step 24 ("Determination of mixture adaptation value") and stores the value in the shift register memory 16 via the branch 26. In the shift register memory 16, this current mixture adaptation value is compared with the mixture adaptation value stored previously in the non-volatile memory, and the result of the comparison is transferred to the following step 28 ("cleaning successful?"). There, the system checks whether a difference between the mixture adaptation value from step 24 and the stored mixture adaptation value is lower than a predetermined threshold value. The threshold used here may, for example, be the same threshold value as in step 18. If the result of this query is "yes", the systems returns to step 10 via the branch 30, and the predetermined minimum operating duration for gas operation is awaited again, until the method starts once more with step 12. If the result in step 28 is "no", the operation of the internal combustion engine with gas is blocked in a subsequent step 32 ("blocking of gas operation"), so that the internal combustion engine is then operated only with carburetor fuel, until the problem of deposits in the fuel injectors has been eliminated, if appropriate at a repair facility.

The term "mixture adaptation" means that system-driven deviations and perturbations from the fuel control are learned and corrected. The primary errors that are to be taken into account in the context are two types of errors, namely, a multiplicative error and an additive error. A multiplicative error that is effected per injection is, for instance, due to incorrect fuel density and/or incorrect fuel pressure. An additive error per time unit is, for instance, due to air leakage or per injection, for example due to the delay of the injection valve and/or due to an incorrect value for the internal exhaust gas. The additive error dominates during overrunning operation (no gear), while the multiplicative error dominates during mean to high load operation.

According to the invention, therefore, the fouling of, for example, direct-injection gasoline injectors in CNG gas engines is monitored. By means of the periodic scavenging actions by a periodic brief changeover to gasoline operation, a mitigation of the risk of persistent fouling is achieved. According to the invention, the operation of the internal combustion engine is monitored in the way described above, and the prophylactic measure mentioned is activated, as required. For this purpose, the mixture adaptation values in straightforward gasoline operation are stored in a non-volatile memory and, during straightforward gasoline operation, the current mixture adaptation value is compared with the preceding value after the predeterminable minimum operating duration in gas operation. The minimum operating duration amounts, for example, to 200 to 40 000 seconds, in particular 2000 to 10 000 seconds, in particular about 5000 seconds. If appropriate, this minimum operating duration can initially build up over a plurality of operating cycles of the internal combustion engine or a plurality of driving cycles of a motor vehicle equipped with the internal combustion engine.

If the rise in the mixture adaptation values overshoots a predeterminable threshold value and/or a predeterminable deviation with respect to the previous value, there is a high probability of fouling of the fuel injector. In this case, independently of the operating state of the engine, a special scavenging action is initiated which comprises 50 to 50 000 times the injector volume, in particular 200 to 1000 times the injector volume. If, after this procedure, no reduction in the mixture adaptation factor by the amount of a predeterminable threshold value is to be observed, information is stored in the fault memory of the engine control apparatus. Alternatively or additionally, the gas operation of the engine is restricted or suppressed.

If, in the meantime, the tank of a vehicle equipped with the internal combustion engine is filled with carburetor fuel, the monitoring of the mixture adaptation value is suppressed, since a different fuel quality may possibly be added by filling the tank, thus leading to a varied mixture adaptation value.

The invention claimed is:

1. A method of operating an internal combustion engine, the method which comprises:
   operating the internal combustion engine with carburetor fuel by injecting the carburetor fuel directly into at least one combustion space of the internal combustion engine by way of at least one fuel injector;
   selectively operating the internal combustion engine with gas instead of injecting the carburetor fuel or in addition to injecting the carburetor fuel;
   continuously determining a mixture adaptation value while the internal combustion engine is operated with carburetor fuel;
   storing a current mixture adaptation value in a memory while the internal combustion engine is being operated with carburetor fuel;
   after a predetermined minimum operating duration with gas, comparing a current mixture adaptation value with a stored mixture adaptation value during the operation of the internal combustion engine with carburetor fuel; and
   if a difference between the current mixture adaptation value and the stored mixture adaptation value overshoots a predetermined differential value, scavenging the at least one fuel injector.

2. The method according to claim 1, wherein the internal combustion engine is an Otto engine in a motor vehicle.

3. The method according to claim 1, wherein the carburetor fuel is gasoline or ethanol (E85) and the gas is compressed natural gas (CNG) or liquefied petroleum gas (LPG).

4. The method according to claim 1, wherein the scavenging step comprises conducting a given quantity of scavenging fuel through each fuel injector to be scavenged.

5. The method according to claim 4, wherein the given quantity of scavenging fuel corresponds to 50 to 50 000 times a volume of carburetor fuel stored in a fuel injector.

6. The method according to claim 4, wherein the given quantity of scavenging fuel corresponds to 200 to 1000 times a volume of carburetor fuel stored in a fuel injector.

7. The method according to claim 1, wherein the predetermined minimum operating duration with gas amounts to 200 seconds to 40 000 seconds.

8. The method according to claim 1, wherein the predetermined minimum operating duration with gas amounts to 2000 seconds to 10 000 seconds.

9. The method according to claim 1, wherein the predetermined minimum operating duration with gas amounts to approximately 5000 seconds.

10. The method according to claim 1, which comprises, after the predetermined minimum operating duration with gas has elapsed, operating the internal combustion engine with carburetor fuel and determining the current mixture adaptation value.

11. The method according to claim 1, which comprises, following the scavenging step, determining a current mixture adaptation value and comparing the current mixture adaptation value with the mixture adaptation value ascertained prior to scavenging, and establishing a fault when a difference between the current mixture adaptation value after scavenging and the mixture adaptation value before scavenging is lower than a predetermined value.

12. The method according to claim 11, which comprises, if a fault has been established, blocking further operation of the internal combustion engine with gas.

13. The method according to claim 1, which comprises storing a current mixture adaptation value after a supply of new carburetor fuel into a fuel tank, after each or a predetermined number of comparisons of a current mixture adaptation value with the stored adaptation value, after each or a predetermined number of starting actions of the internal combustion engine, after each or a predetermined number of driving cycles, after each successful scavenging of the fuel injectors, and/or after a predetermined number of successful scavengings of the fuel injectors.

* * * * *